US008598484B2

(12) United States Patent
Engel et al.

(10) Patent No.: US 8,598,484 B2
(45) Date of Patent: Dec. 3, 2013

(54) SYSTEM AND APPARATUS FOR CIRCUIT PROTECTION WITHIN AN EQUIPMENT ENCLOSURE

(75) Inventors: Aaron Engel, Plainville, CT (US); Daniel Edward Delfino, Plainville, CT (US); Michael Lafond, Plainville, CT (US)

(73) Assignee: General Electric Company, Schenectady, NY (US)

( * ) Notice: Subject to any disclaimer, the term of this patent is extended or adjusted under 35 U.S.C. 154(b) by 237 days.

(21) Appl. No.: 12/981,967

(22) Filed: Dec. 30, 2010

(65) Prior Publication Data

US 2012/0168406 A1  Jul. 5, 2012

(51) Int. Cl.
*H01H 9/52* (2006.01)

(52) U.S. Cl.
USPC .......................................... 218/157; 361/605

(58) Field of Classification Search
USPC ...................... 361/605–608; 218/155–157
See application file for complete search history.

(56) References Cited

U.S. PATENT DOCUMENTS

| | | | | |
|---|---|---|---|---|
| 5,193,049 A * | 3/1993 | Jackson | ........................ | 361/676 |
| 5,574,624 A | 11/1996 | Rennie et al. | | |
| 5,710,402 A | 1/1998 | Karnbach et al. | | |
| 5,892,195 A * | 4/1999 | Aufermann et al. | .......... | 218/157 |
| 6,310,283 B1 | 10/2001 | Lichtenberg | | |
| 6,407,331 B1 | 6/2002 | Smith et al. | | |
| 6,417,443 B1 | 7/2002 | Smith | | |
| 6,561,604 B2 | 5/2003 | Leccia et al. | | |
| 7,236,352 B2 * | 6/2007 | Dalis | .............................. | 361/608 |
| 7,576,985 B2 * | 8/2009 | Kingston | ...................... | 361/690 |
| 7,598,833 B1 * | 10/2009 | Hodges et al. | ................ | 335/201 |

(Continued)

FOREIGN PATENT DOCUMENTS

| | | |
|---|---|---|
| EP | 1498921 A1 | 1/2005 |
| WO | 9713264 A1 | 4/1997 |
| WO | 9824159 A2 | 6/1998 |
| WO | 03061358 A2 | 7/2003 |
| WO | 2009001425 A1 | 12/2008 |

OTHER PUBLICATIONS

Record of Conference Papers, Institute of Electrical and Electronics Engineers Incorporated Industry Applications Society 41st Annual, Petroleum and Chemical Industry Conference; Title: "The Safety Benefits of ARC Resistant Metal CLAD Medium Voltage Switchgear", Published Dec. 14, 1994; Authors: Kalkstein, et al; pp. 309 to 317.

(Continued)

*Primary Examiner* — Truc Nguyen
(74) *Attorney, Agent, or Firm* — Global Patent Operation; Stephen G. Midgley

(57) ABSTRACT

An enclosure is provided for use with a circuit protection system having at least one exhaust duct configured to route exhaust gases out of the circuit protection system. The enclosure includes a first barrier coupled to the circuit protection system, a second barrier coupled to the circuit protection system, and a top wall coupled to the first barrier and the second barrier. The first barrier and the second barrier define an exhaust plenum coupled in flow communication with the at least one exhaust duct. A vent extends through the top wall and is coupled in flow communication with the exhaust plenum to route the exhaust gases out of the enclosure.

20 Claims, 14 Drawing Sheets

(56) References Cited

U.S. PATENT DOCUMENTS

| | | |
|---|---|---|
| 7,821,749 B2 | 10/2010 | Asokan |
| 7,821,774 B2 | 10/2010 | Josten et al. |
| 7,952,857 B1 * | 5/2011 | Motley et al. ............ 361/678 |
| 2005/0012578 A1 * | 1/2005 | Afshari et al. ............ 335/202 |
| 2009/0212022 A1 | 8/2009 | Josten et al. |
| 2009/0308845 A1 | 12/2009 | Bohori et al. |
| 2010/0258532 A1 | 10/2010 | Miller et al. |

OTHER PUBLICATIONS

Industry Applications Society Meeting, 2009; Title: "ARC-Flash Energy Mitigation by Fast Energy Capture", published Oct. 4, 2009; Authors: Roscoe, et al; pp. 1-9.

Search Report and Written Opinion from EP Application No. 11194828.7 dated Sep. 6, 2013.

* cited by examiner

SYSTEM AND APPARATUS FOR CIRCUIT PROTECTION WITHIN AN EQUIPMENT ENCLOSURE

BACKGROUND OF THE INVENTION

The embodiments described herein relate generally to power equipment protection devices and, more particularly, to apparatus for use in channeling exhaust gases and pressure away from a location of arc generation.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables formation of an arc flash.

An arc flash includes a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. Moreover, an arc flash can release significant energy in the form of heat, intense light, pressure waves, and/or sound waves, sufficient to damage the conductors and adjacent equipment. However, the current level of a fault that generates an arc flash is generally less than the current level of a short circuit, such that a circuit breaker may not trip or exhibits a delayed trip unless the circuit breaker is specifically designed to handle an arc fault condition.

Standard circuit protection devices, such as fuses and circuit breakers, generally do not react quickly enough to mitigate an arc flash. One known circuit protection device that exhibits a sufficiently rapid response is an electrical "crowbar," which utilizes a mechanical and/or electro-mechanical process by intentionally creating an electrical "short circuit" to divert the electrical energy away from the arc flash point. Such an intentional short circuit fault is then cleared by tripping a fuse or a circuit breaker. However, the intentional short circuit fault created using a crowbar may allow significant levels of current to flow through adjacent electrical equipment, thereby still enabling damage to the equipment.

Another known circuit protection device that exhibits a sufficiently rapid response is an arc containment device, which creates a contained arc to divert the electrical energy away from the arc flash point. For example, some known devices generate an arc, such as a secondary arc flash, for use in dissipating energy associated with a primary arc flash detected on a circuit. At least some known arc containment devices include an exhaust port positioned along a side surface to shorten an exhaust path away from the location where the secondary arc flash is created and into the ambient. However, such venting schemes release hot gases at high pressure into an equipment enclosure, which can cause additional damage to other electronics modules within the same enclosure.

For at least the reasons stated above, a need exists for an arc containment device having an improved equipment enclosure that directs exhaust gasses from an exhaust port on the arc containment device upwards and out of the equipment enclosure.

Additionally, for at least the reasons stated above, a need exists for an equipment enclosure that is simple, robust, inexpensive, and without moving parts to route exhaust gases away from sensitive circuitry.

BRIEF DESCRIPTION OF THE INVENTION

In one aspect, an enclosure is provided for use with a circuit protection system having at least one exhaust duct configured to route exhaust gases out of the circuit protection system. The enclosure includes a first barrier coupled to the circuit protection system, a second barrier coupled to the circuit protection system, and a top wall coupled to the first barrier and the second barrier. The first barrier and the second barrier define an exhaust plenum coupled in flow communication with the at least one exhaust duct. A vent extends through the top wall and is coupled in flow communication with the exhaust plenum to route the exhaust gases out of the enclosure.

In another aspect, a switchgear stack includes a circuit protection system including at least one exhaust duct. The circuit protection system is configured to detect an arc flash event in a circuit and to initiate an arc in response to the detection of the arc flash event. The at least one exhaust duct is configured to route exhaust gases out of the circuit protection system. The switchgear stack also includes an enclosure coupled to the circuit protection system. The enclosure includes a first barrier coupled to the circuit protection system and a second barrier coupled to the circuit protection system. The first barrier and the second barrier define an exhaust plenum coupled in flow communication with the at least one exhaust duct to route the exhaust gases out of the enclosure.

In another aspect, a method is provided for assembling a switchgear stack that includes an enclosure and a circuit protection system positioned within the enclosure, wherein the circuit protection system includes at least one exhaust duct, a first crossmember, and a second crossmember. The method includes coupling a first barrier to the first crossmember, wherein at least a portion of the first barrier extends substantially vertically. The method also includes coupling a second barrier to the second crossmember, wherein at least a portion of the second barrier extends substantially vertically such that the first barrier and the second barrier define an exhaust plenum coupled in flow communication with the at least one exhaust duct to route exhaust gases out of the enclosure.

DETAILED DESCRIPTION OF THE INVENTION

Exemplary embodiments of systems and apparatus for use with a circuit protection system are described herein. These embodiments enhance the flow of exhaust gases, heat, and pressure out of the circuit protection system after an arc flash is generated. For example, the circuit protection system can receive a signal that indicates detection of a primary arc flash within a power system coupled to the circuit protection system. The circuit protection system can then generate a secondary arc flash to transfer the energy generated by the primary arc flash away from the power system. Moreover, these embodiments enhance the flow of exhaust gases, heat, and pressure out of an equipment enclosure that contains the circuit protection system. Routing the exhaust gases away from the circuit protection device, such as, for example, in a substantially vertical direction, protects the circuit protection system and any other electrical equipment that is positioned within the equipment enclosure from the flow of exhaust gases, heat, and pressure.

Figure 1:
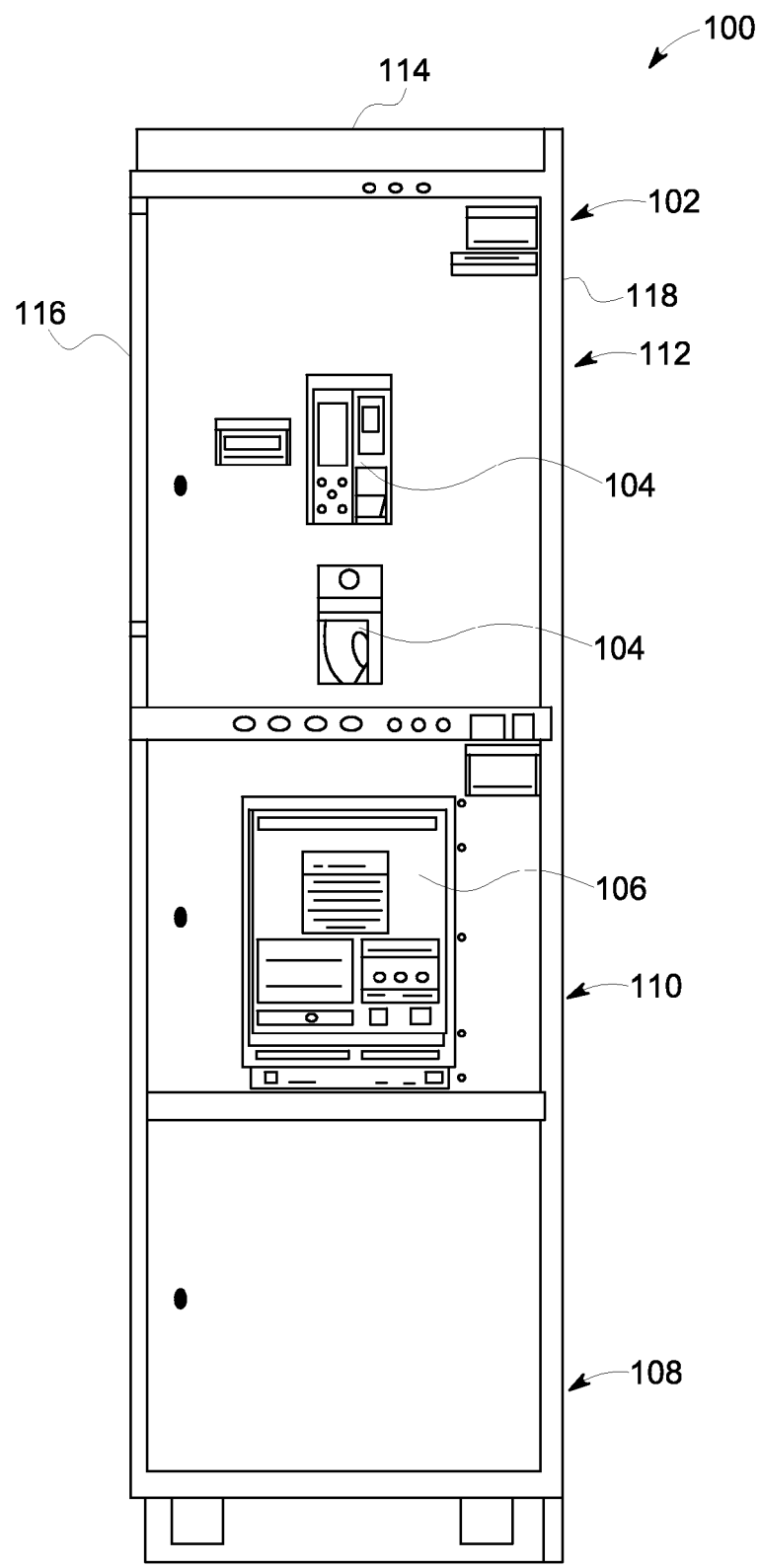
FIG. 1 is a front view of an exemplary electronic equipment stack having a circuit protection system.

FIG. 1 is a front view of an exemplary electronic equipment stack 100 that is housed within an equipment enclosure 102. Stack 100 includes one or more electronics modules 104 and a circuit protection system 106 that provides electronics modules 104 with protection from, for example, arc flash events. Enclosure 102 includes a plurality of compartments, including a lower compartment 108, a center compartment 110 that houses circuit protection system 106, and an upper compartment 112 that houses electronics modules 104. Enclosure 102 has a top wall 114 that extends between a first side wall 116 of enclosure 102 and a second side wall 118. An exhaust opening (not shown in FIG. 1), such as a vent, extends through top wall 114 and is coupled in flow communication to an exhaust plenum (not shown in FIG. 1). The exhaust plenum extends downward from top wall 114 behind electronics modules 102, and into center compartment 110 where the exhaust plenum is positioned with respect to circuit protection system 106. Notably, circuit protection system 106 includes an arc transfer device (not shown in FIG. 1). The arc transfer device transfers energy away from a detected arc flash event in a circuit, such as electronics module 104 or a power feed. The arc transfer device may be an arc containment device, which is described in greater detail below. Alternatively, the arc transfer device may be a bolted fault device that transfers the energy associated with the arc flash event to another location to dissipate in any suitable manner.

Figure 2:
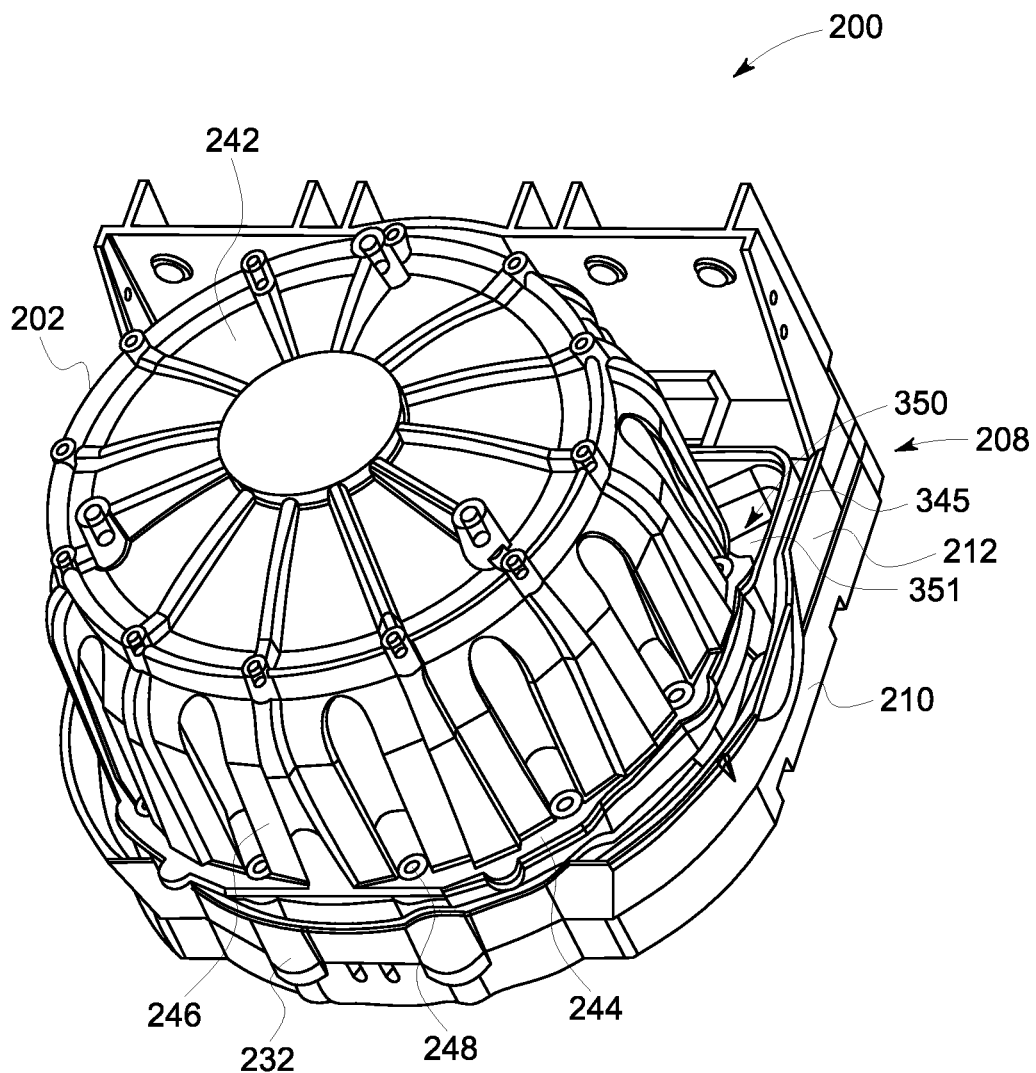
FIG. 2 is a perspective schematic diagram of an exemplary arc containment device that may be used with the circuit protection system shown in FIG. 1.
Figure 3:
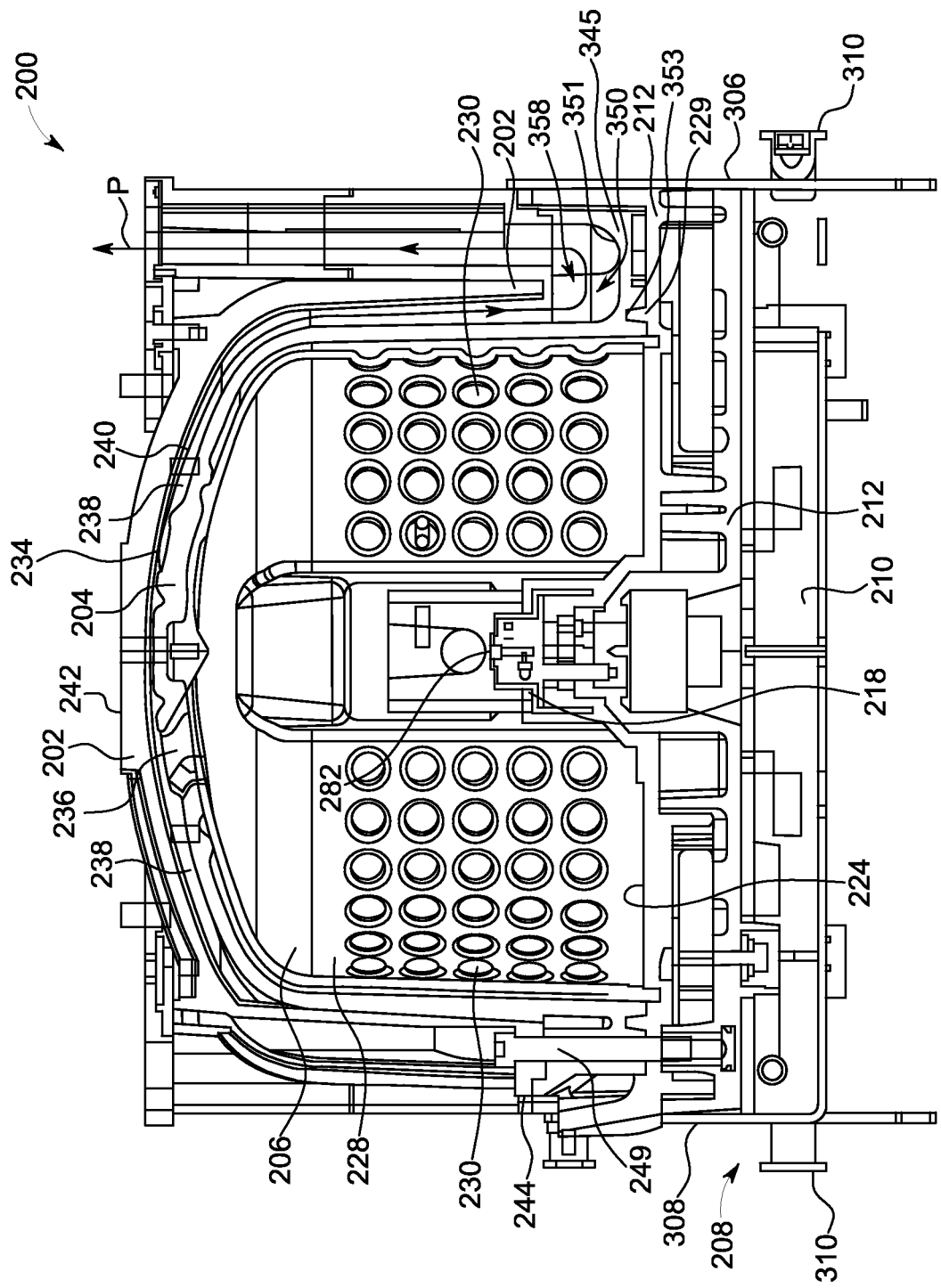
FIG. 3 is a cross-section schematic diagram of the arc containment device shown in FIG. 2.
Figure 4:
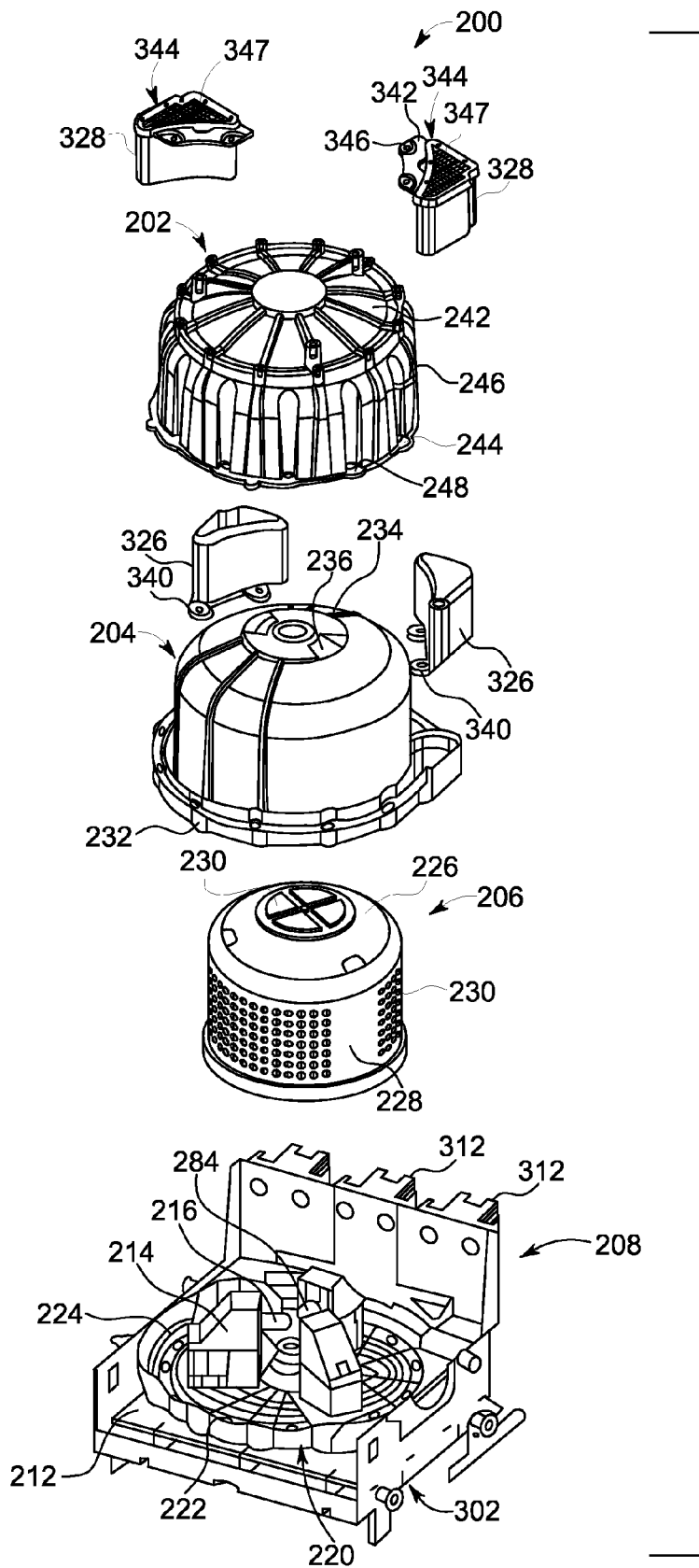
FIG. 4 is a partially exploded diagram of the arc containment device shown in FIG. 2.

FIG. 2 is a perspective schematic diagram of an exemplary arc containment device 200 that may be used with circuit protection system 106 of FIG. 1; FIG. 3 is a cross-section schematic diagram of arc containment device 200; and FIG. 4 is a partially exploded diagram of arc containment device 200. In an exemplary embodiment, arc containment device 200 includes a top cover 202 (FIGS. 2-6), an exhaust manifold 204 (FIGS. 3 and 4), a shock shield 206 (FIGS. 3 and 4), and a conductor assembly 208 (shown in FIG. 4). As shown in FIGS. 2, 3, 5, and 6, conductor assembly 208 includes a conductor base 210 and a conductor cover 212 with a plurality of electrical conductors (not shown) positioned therebetween. Each electrical conductor is coupled to an electrode support 214 that supports an arc source electrode 216 (FIG. 4). Each arc source electrode 216 is rigidly mounted onto the conductor cover 212 and spaced apart to define an electrode gap 284 and between arc source electrodes 216. Each electrical conductor (not shown) extends through conductor base 210 to connect electrodes 216 to a power source (not shown), such as a power bus. Conductor base 210 and conductor cover 212 may be made of any suitable electrically insulating material and composites to provide an electrically insulative support for electrodes 216.

An arc triggering device, such as a plasma gun 282, is disposed proximate gap 284. For example, plasma gun 282 may be centrally disposed with respect to arc source electrodes 216, and configured to ionize a portion of the space in gap 284. In one embodiment, plasma gun 282 injects plasma as an arc mitigation technique, to create a secondary arcing fault in response a signal indicative of a primary arc flash within the power system coupled to the circuit protection system 106. In an embodiment, plasma gun 282 is covered by a plasma gun cover 218 (FIG. 3). In operation, arc source electrodes 216 generate an arc, such as a secondary arc flash, for use in dissipating energy associated with a primary arc flash detected on a circuit, thus producing exhaust gases, heat, and pressure within arc containment device 200.

Conductor cover 212 includes a plurality of mounting apertures (not shown) that are each sized to receive a respective fastening mechanism therein to couple conductor cover 212 to a support, such as conductor base 210. Moreover, conductor cover 212 includes an edge portion 220 having a plurality of recesses 222 formed therein (FIG. 4). As will be discussed in more detail below, conductor cover 212 includes one or more mating features, such as a rib 229, configured to mate with a corresponding mating feature, such as a slot 353, formed in an exhaust port member 345 of exhaust manifold 204.

Top cover 202 includes a top surface 242, a lip 244, and a side surface 246 extending between top surface 242 and lip 244. Lip 244 is sized to overlay exhaust manifold posts 232 (FIGS. 2 and 4), and includes a plurality of mounting apertures 248 that are sized to receive a respective fastening mechanism 249, such as a threaded bolt, therein to couple to conductor cover 212. For example, each mounting aperture 248 of top cover 202 aligns with a respective mounting aperture of exhaust manifold 204 and a respective mounting aperture 222 of conductor cover 212.

Moreover, as shown in FIGS. 3 and 4, shock shield 206 is sized to cover electrodes 216, and is disposed over electrodes 216, such that the arc source is contained within shock shield 206. In an embodiment shock shield 206 is fixedly coupled to a top surface 224 of conductor cover 212.

In an exemplary embodiment, shock shield 206 includes a top surface 226 and a side surface 228. A plurality of exhaust vents 230 are formed in top and side surfaces 226 and 228. Exhaust manifold 204 is sized to cover shock shield 206. Exhaust manifold 204 includes a plurality of posts 232 (FIG. 4). Each post 232 includes a mounting aperture (not shown) sized to receive a respective fastening mechanism therein to couple exhaust manifold 204 to conductor cover 212. Moreover, each post 232 is sized to fit within a respective recess 222 of conductor cover 212.

In an exemplary embodiment, and as shown in FIG. 3, top cover 202 is sized to cover exhaust manifold 204 such that the manifold 204 is contained with cover 202 and to define a cavity 238 therebetween for use as a passageway or exhaust path 240, generally indicated in FIG. 3 by arrow "P". In an exemplary embodiment, exhaust manifold 204 also includes a top surface 234 with a plurality of exhaust vents 236 extending therethrough and in flow communication with exhaust path 240. Likewise, the plurality of exhaust vents 236 are in flow communication with the plurality of exhaust vents 230 of shock shield 206. Additionally, exhaust manifold 204 includes at least one exhaust port member 345. Exhaust port member 345 includes a first exhaust port surface 351 configured to cooperate with a portion of top cover 202 to define an opening or gap 358. Gap 358 is disposed in flow communication with the exhaust path 240 and arranged to provide an exhaust port 350 for the venting of exhaust gases, heat, and pressure from cavity 238 and out of arc containment device 200. In an exemplary embodiment, exhaust manifold 204 includes two exhaust port members 345 formed on the exterior of exhaust manifold 204.

Figure 5:
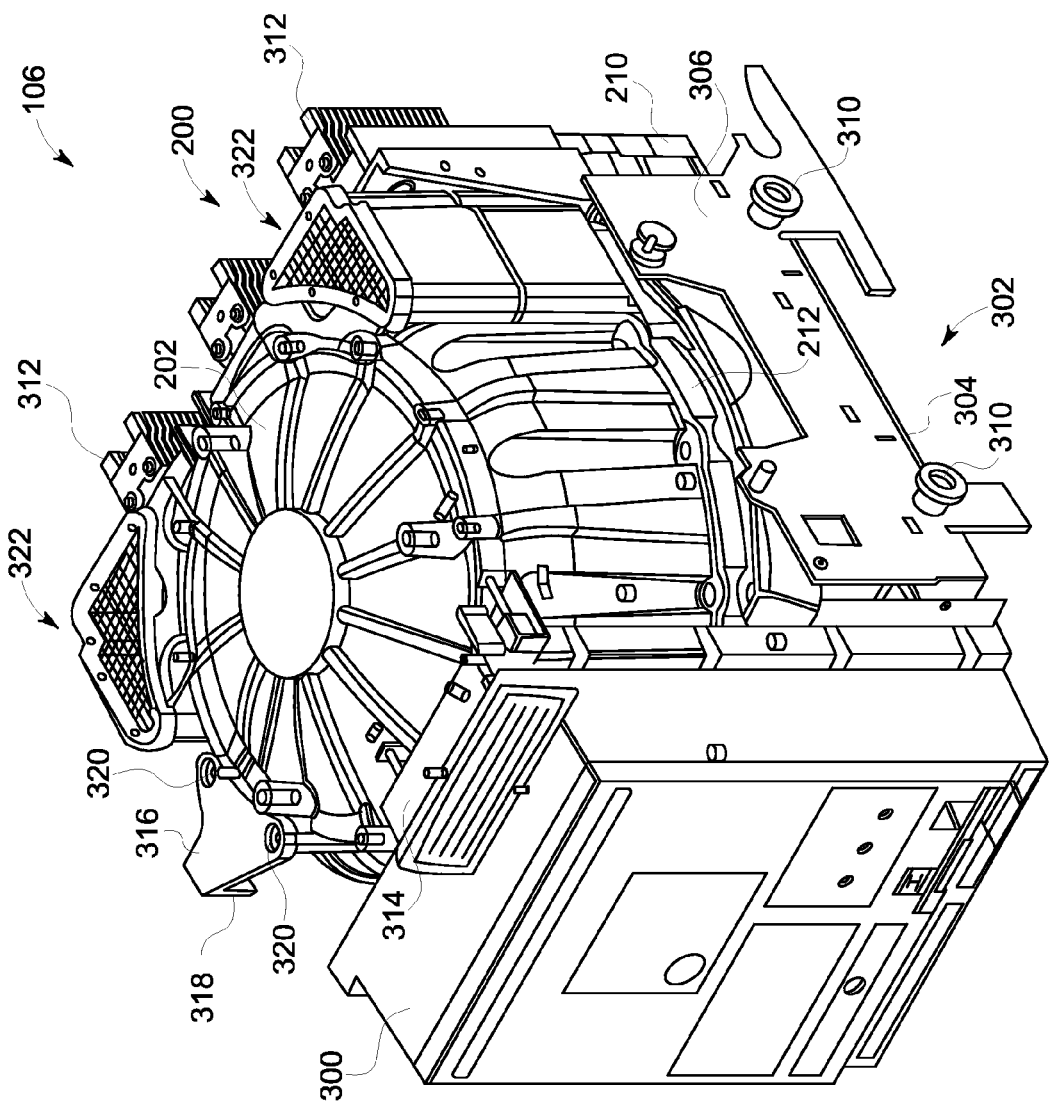
FIG. 5 is a perspective schematic diagram of the circuit protection system shown in FIG. 1.
Figure 6A:
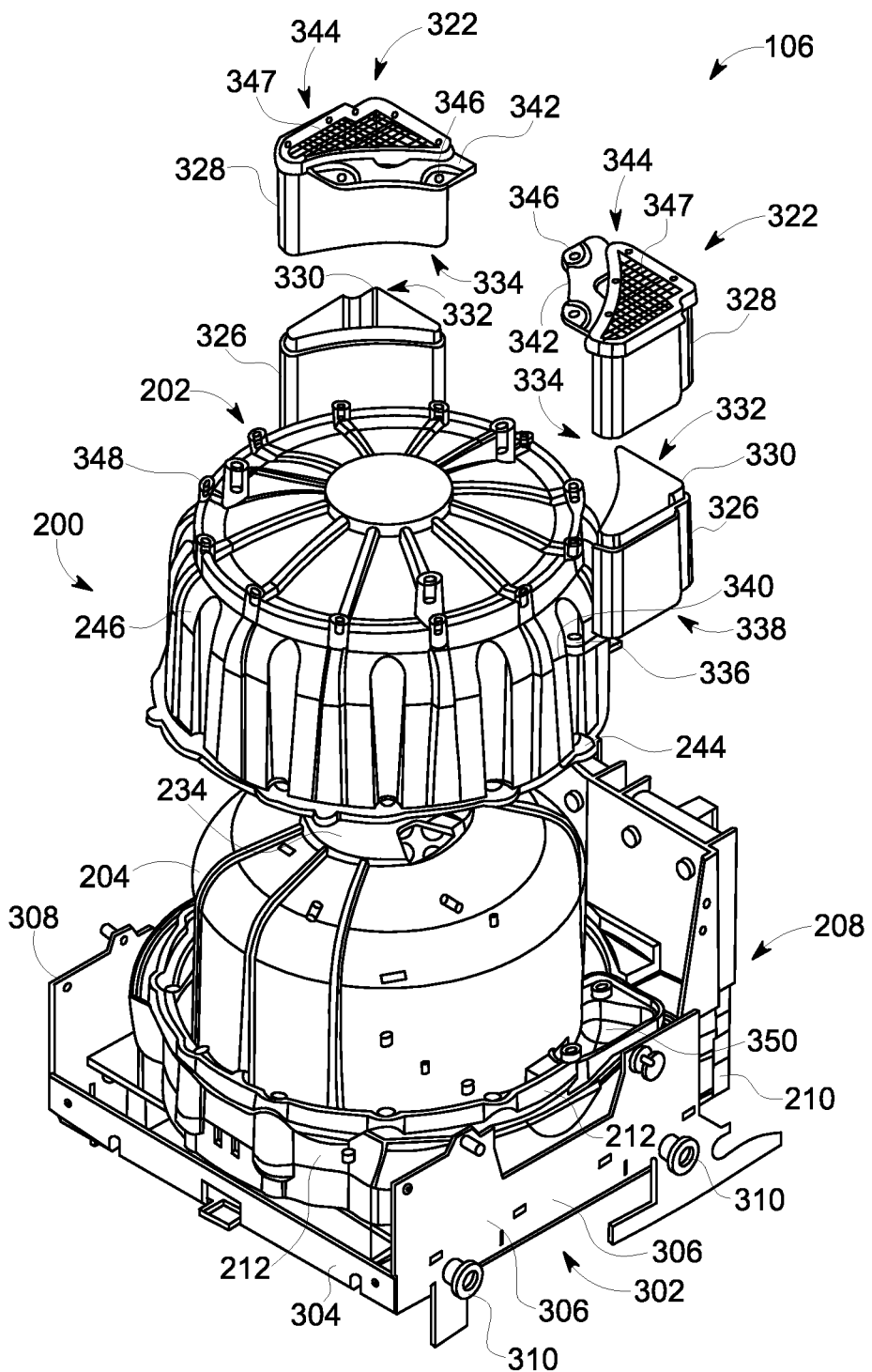
FIG. 6 is a partially exploded view of the circuit protection system shown in FIG. 1.
Figure 6B:
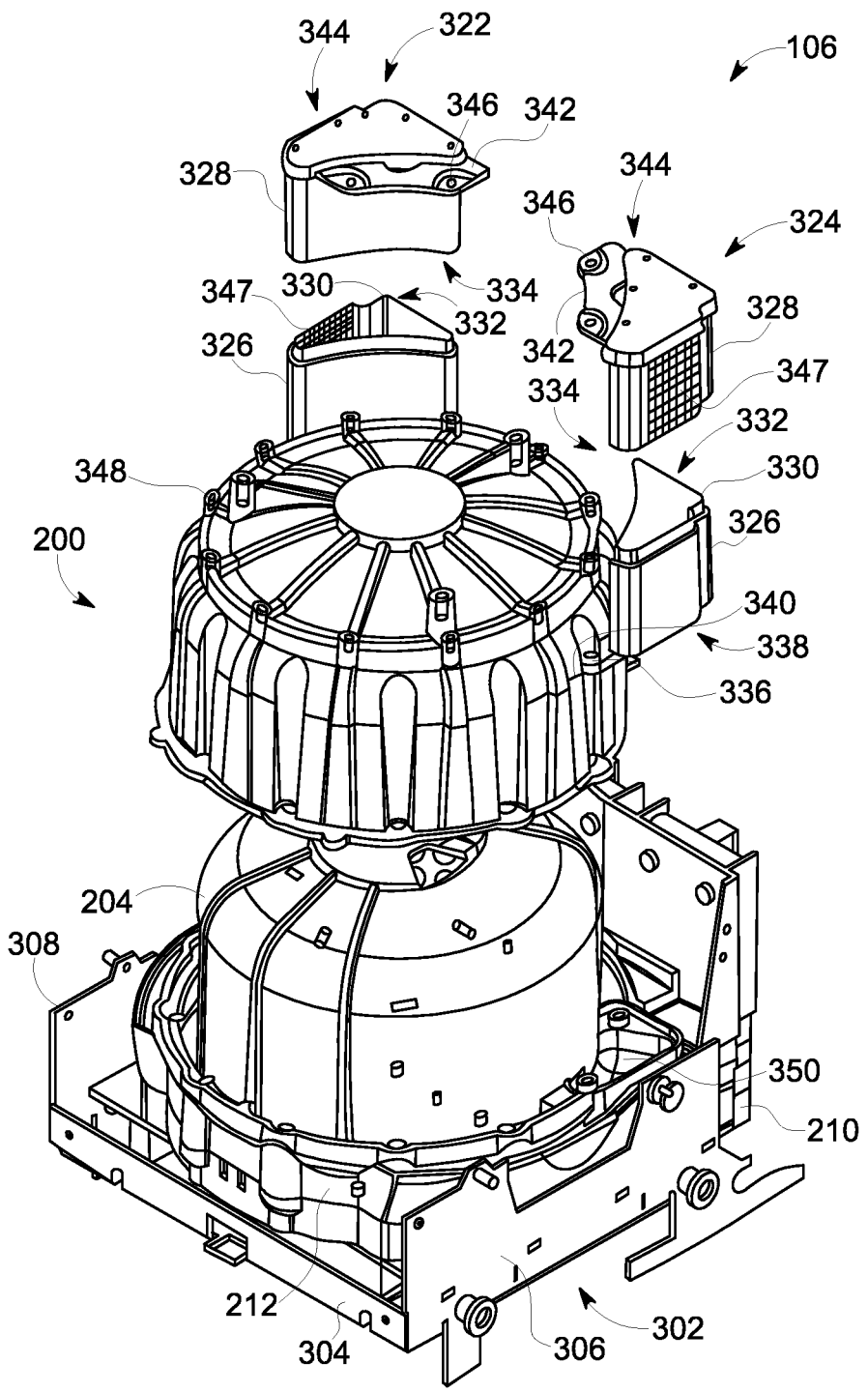

Furthermore, arc containment device 200 includes one or more non-conductive exhaust ducts 322 positioned on the periphery of top cover 202. In an exemplary embodiment, as illustrated in FIGS. 4-6, arc containment device 200 includes two exhaust ducts 322. Each exhaust duct 322 directs exhaust gases from exhaust ports 350 into an exhaust plenum (not shown) positioned in flow communication with exhaust ducts 322 to route the exhaust gases out of equipment enclosure 102.

FIG. 5 is a perspective schematic diagram of circuit protection system 106, and FIG. 6 is a partially exploded view of circuit protection system 106. In an exemplary embodiment, circuit protection system 106 includes a controller 300 and arc containment device 200. A frame 302 is sized to support arc containment device 200 within equipment enclosure 102 (FIG. 1). In an exemplary embodiment, frame 302 is electrically coupled to ground. Controller 300 is coupled to frame 302 to secure controller 300 to arc containment device 200 when inserting or removing circuit protection system 106 from equipment enclosure 102. In an exemplary embodiment, frame 302 includes a bottom wall 304, a first side wall 306, and a second side wall 308. Side walls 306 and 308 each include one or more rollers 310 that are sized to be inserted into or used with racking rails (not shown) provided within an enclosure compartment, such as center compartment 110 (FIG. 1).

Moreover, a plurality of first primary electrical connectors 312 are coupled to arc containment device 200 to facilitate electrically connecting arc containment device 200 to a plurality of conductors (not shown) of a circuit (not shown) that is being monitored and/or protected by arc containment device 200. Moreover, controller 300 (shown in FIG. 5) includes a first secondary electrical connector 314 that facilitates connecting controller 300 to a second secondary connector (not shown) for use in performing diagnostics and/or plasma gun firing tests. A position indicator 316 is coupled to top cover 202 and is oriented to engage a switch (not shown) that is provided in a racking cassette (not shown in FIG. 5) to facilitate indicating a position of arc containment device 200 within the racking cassette as described in greater detail below. For example, position indicator 316 includes a flange 318 having one or more mounting apertures 320 extending therethrough and sized to receive a respective fastening mechanism to couple position indicator 316 to top cover 202. Accordingly, top cover 202 includes one or more corresponding mounting apertures (not shown) that are positioned beneath respective mounting apertures 320 of flange 318. Notably, position indicator 316 may be coupled to any suitable portion of arc containment device 200 that enables the switch to indicate the position of arc containment device 200 within the racking cassette.

During operation, controller 300 receives a signal from, for example, electronics modules 104 (FIG. 1), indicating detection of a primary arc flash on a circuit that is monitored by one or more monitoring devices (not shown), such as a current sensor, a voltage sensor, and the like. In response to the detection, controller 300 causes plasma gun 282 to emit a plume of an ablative plasma. Specifically, plasma gun 282 emits the plasma into gap 284 defined between arc source electrodes 216 (FIG. 4). The plasma lowers an impedance between the tips of electrodes 216 to enable formation of a secondary arc flash. The secondary arc flash releases energy including heat, pressure, light, and/or sound.

The secondary arc flash also creates exhaust gases. The exhaust gases are channeled through exhaust vents 230 of shock shield 206. The exhaust gases are also channeled through exhaust vents 236 (FIG. 4) of exhaust manifold 204, and into exhaust path 240 (FIG. 2) defined between exhaust manifold 204 and top cover 202. The exhaust gases flow along exhaust path 240 and are channeled in a first direction through exhaust ports 350 and then channeled in a second direction through exhaust ducts 322, and out of arc containment device 200 such as into an exhaust plenum (not shown in FIGS. 5 and 6) within equipment enclosure 102.

While each exhaust duct 322 is shown in the Figures, by way of example and not limitation, as having a generally triangular cross-section, it is contemplated that each exhaust duct 322 may comprise a pipe, tube, or channel having any generally convenient cross-section. Likewise, while the embodiments in the Figures, by way of example and not limitation, illustrate two exhaust ports 350, it will be understood that any number of exhaust ports may be formed as described, and arranged in flow communication with the exhaust path 240. Likewise, while the embodiments in the Figures, by way of example and not limitation, illustrate two exhaust ducts 322 connected in flow communication with corresponding exhaust ports 350, it will be understood that any number of exhaust ducts 322 may be provided in an embodiment. In an embodiment, as shown in FIG. 6, each exhaust duct 322 and 324 includes a lower or first exhaust duct portion 326 and an upper or second exhaust duct portion 328 that is coupled to lower exhaust duct portion 326. For example, lower exhaust duct portion 326 includes a lip 330 that extends at least partially along a periphery of a top end 332. Lip 330 is sized to be inserted into a bottom end 334 of upper exhaust duct portion 328. Lower exhaust duct portion 326 includes a flange 336 along at least a portion of a bottom end 338. Flange 336 includes a plurality of mounting apertures 340 that are sized to receive a respective fastening mechanism therein to couple to top cover 202. For example, each mounting aperture 340 of lower exhaust duct portion 326 aligns with a respective mounting aperture 248 of top cover 202 and a respective mounting aperture of exhaust manifold 204. Similarly, upper exhaust duct portion 328 includes a flange 342 along at least a portion of a top end 344. Flange 342 includes a plurality of mounting apertures 346 that are sized to receive a respective fastening mechanism therein to couple to top cover 202. For example, each mounting aperture 346 of upper exhaust duct portion 328 aligns with a respective mounting aperture 348 of top cover 202. Preferably, and as shown in FIGS. 5 and 6, the distal end of upper exhaust duct portion 328 is configured with a protective mesh or screen 347 to prevent undesired entry of objects into exhaust ducts 322.

Figure 7:
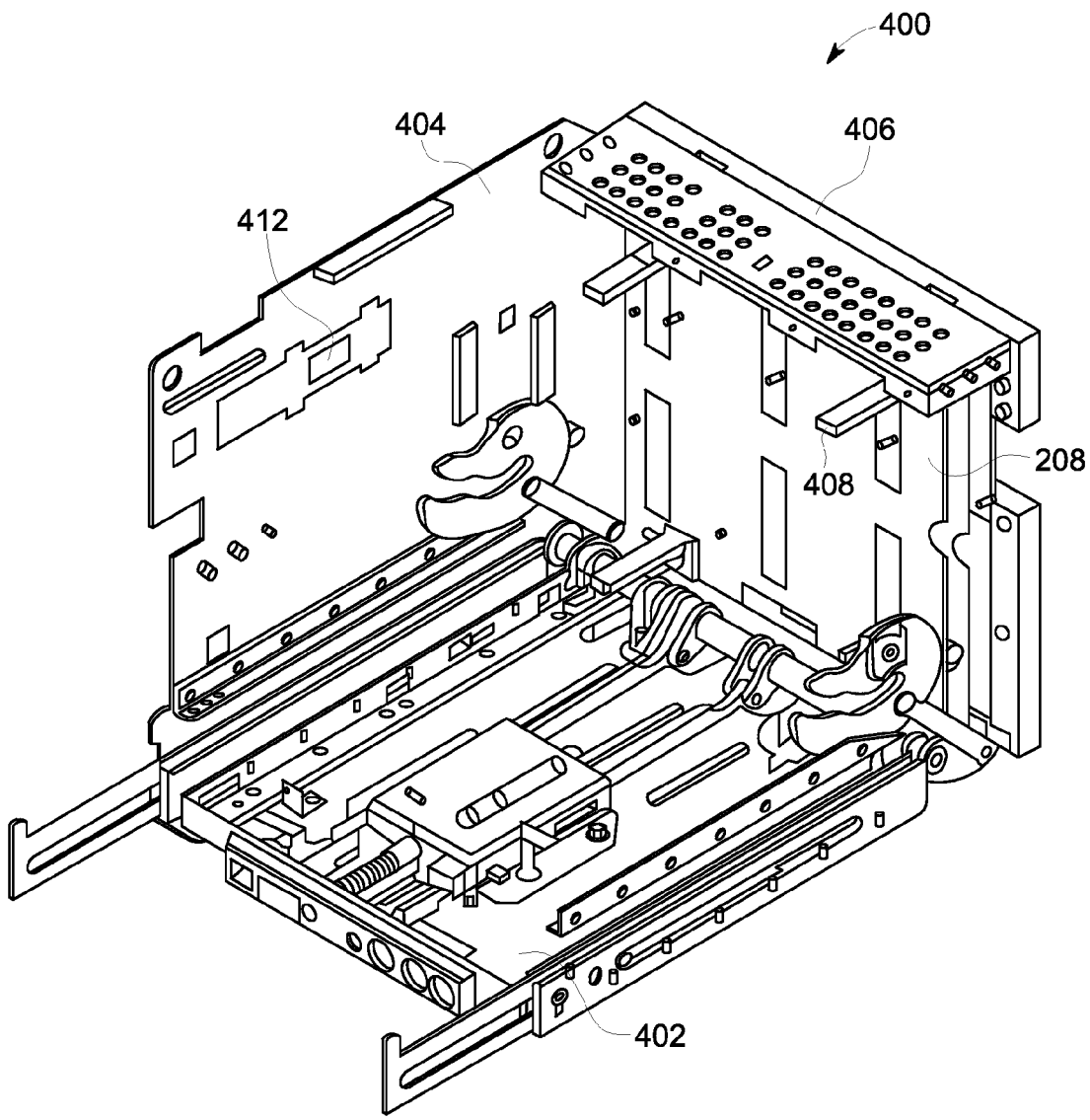
FIG. 7 is a perspective schematic diagram of an exemplary racking cassette that may be used with the circuit protection system shown in FIG. 1.

FIG. 7 is a perspective schematic diagram of an exemplary racking cassette 400 that may be used with circuit protection system 106 (shown in FIG. 1). Racking cassette 400 is configured to support arc containment device 200 (shown in FIGS. 2-4) and facilitates racking circuit protection system 106 in an equipment rack (not shown) within enclosure 102

(shown in FIG. 1). In the exemplary embodiment, racking cassette 400 includes a bottom surface or tray 402, a first side wall 404, and an opposite second side wall (not shown). A rear wall 406 extends between first side wall 404 and the second side wall. Moreover, racking cassette 400 includes a plurality of projections 408 that extend from rear wall 406 through an inner wall 410. Projections 408 are movable with respect to inner wall 410 such that, when arc containment device 200 is inserted into racking cassette 400, projections 408 are pushed back into rear wall 406 to expose the second primary connectors. First primary connectors 312 (shown in FIG. 5) are configured to couple to a corresponding plurality of second primary connectors (not shown) that are positioned between rear wall 406 and inner wall 408 to connect arc containment device 200 to a line voltage of equipment stack 100 (shown in FIG. 1). In addition, a plurality of cross members (not shown in FIG. 7) are coupled to cassette 400 to facilitate coupling components of the exhaust plenum to circuit protection system 106.

When circuit protection system 106 is racked in a first position, such as a test position, within the equipment rack, first primary connectors 312 are disconnected from the second primary connectors, and first secondary connector 314 is electrically coupled to the second secondary connector. Specifically, the second secondary connector moves forward away from rear wall 406 to maintain the electrical connection to first secondary connector 314. When circuit protection system 106 is racked in the test position, arc containment device 200 is in a test mode that enables testing of a device interface and signal controls. For example, power is supplied to controller 300 for testing arc flash detection components and/or for testing whether a plasma gun capacitor bank is charging properly during the connect mode. When circuit protection system 106 is racked in the first position, exhaust ducts 322 and 324 are aligned with the exhaust plenum within enclosure 102 to facilitate routing any exhaust gases generated within arc containment device 200 out of enclosure 102 during, for example, a test of the plasma gun.

When circuit protection system 106 is racked in a second position, such as a connected position, within the equipment rack, first primary connectors 312 are electrically coupled to the second primary connectors, and first secondary connector 314 is electrically coupled to the second secondary connector. Specifically, projections 408 are pushed back and into rear wall 406 to expose the second primary connectors and first primary connectors 312 connected thereto. When circuit protection system 106 is racked in the connected position, arc containment device 200 is active. For example, power is supplied to controller 300 for charging a plasma gun capacitor bank (not shown) that is used to provide power to a plasma gun (not shown) for use in initiating a secondary arc flash between electrodes 216 (shown in FIG. 4). When circuit protection system 106 is racked in the second position, exhaust ducts 322 and 324 are aligned with the exhaust plenum within enclosure 102 to facilitate routing any exhaust gases generated within arc containment device 200 out of enclosure 102 after, for example, creation of a secondary arc flash within arc containment device 200.

When circuit protection system 106 is racked in a third position, such as a disconnect position, within the equipment rack, first primary connectors 312 are disconnected from the second primary connectors, and first secondary connector 314 is disconnected from a second secondary connector (not shown). In addition, projections 408 move forward away from rear wall 406 to shield the second primary connectors behind inner wall 410. When circuit protection system 106 is racked in the disconnect position, circuit protection system 106 may be removed from the equipment rack to be serviced and/or replaced. Moreover, position indicator 316 engages a switch 412 that is provided along first side wall 404. Switch 412 transmits a signal to a switchgear controller (not shown) to indicate that arc containment device 200 is ready to be racked in. When circuit protection system 106 is racked in the third position, exhaust ducts 322 and 324 are not aligned with the exhaust plenum within enclosure 102.

Figure 8:
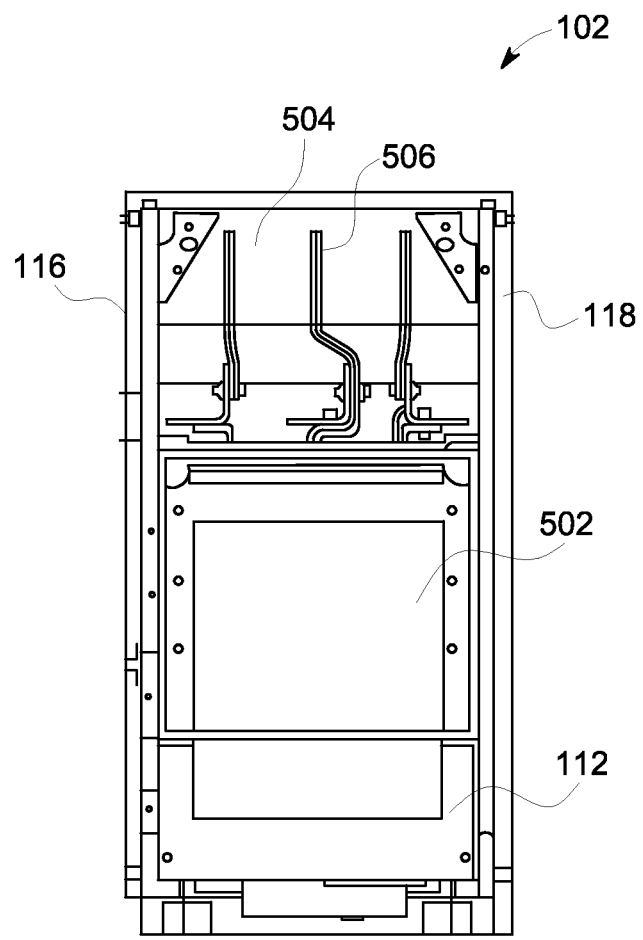
FIG. 8 is a top view of an exemplary equipment enclosure that may be used with the equipment stack shown in FIG. 1.
Figure 9:
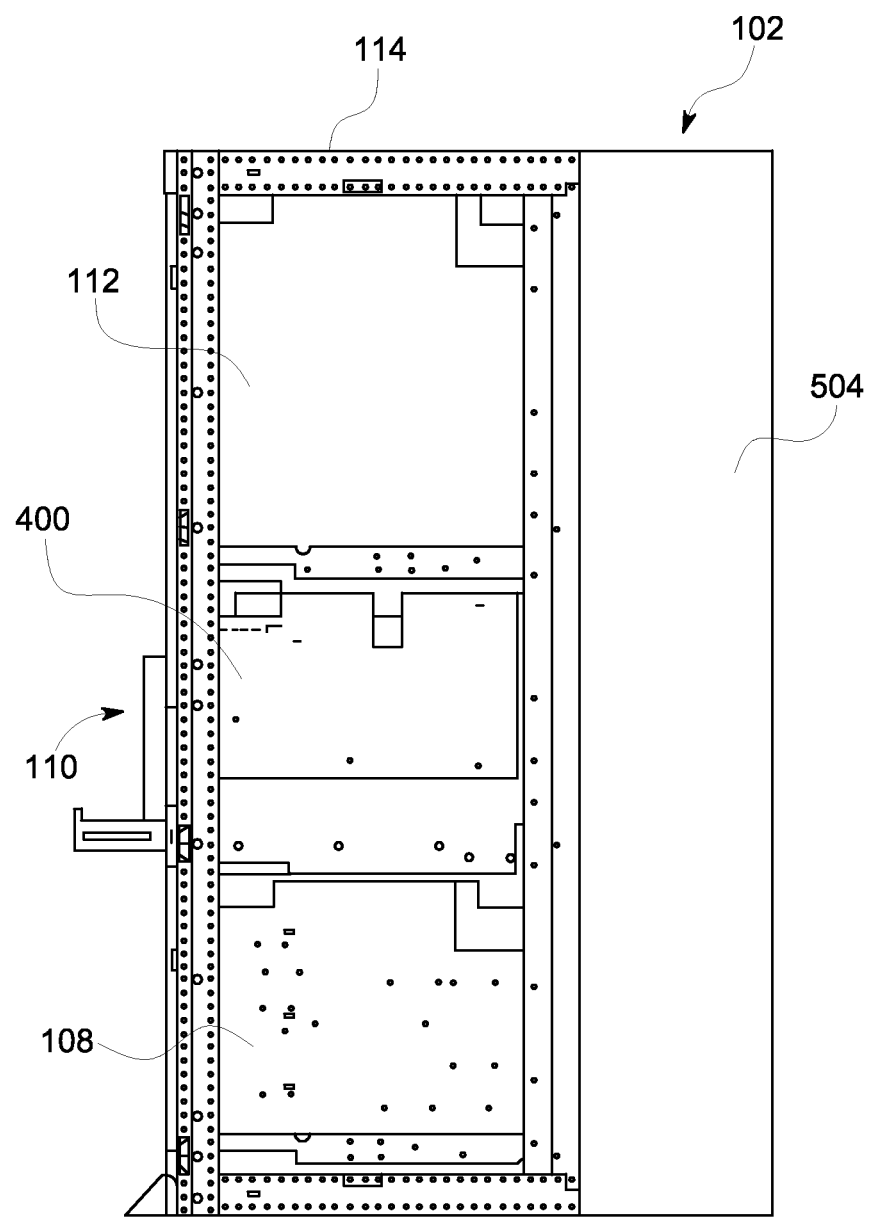
FIG. 9 is a cross-sectional view of the equipment enclosure shown in FIG. 8.

FIG. 8 is a top view of equipment enclosure 102, and FIG. 9 is a cross-sectional view of equipment enclosure 102. In an exemplary embodiment, enclosure 102 includes lower compartment 108, center compartment 110, and upper compartment 112. Center compartment 110 houses circuit protection system 106, and upper compartment 112 houses electronics modules 104 such as power supplies, fuses, relays, light sensors, and/or any other suitable circuitry for detecting a primary arc flash. Top wall 114 extends between first side wall 116 and second side wall 118. An exhaust opening, such as a vent, extends through top wall 114 and is positioned or coupled in flow communication to an internal exhaust plenum 502. Exhaust plenum 502 extends downward from top wall 114 behind electronics modules 104, and into center compartment 110 where exhaust plenum 502 is positioned adjacent circuit protection system 106. Enclosure 102 also includes a rear compartment 504 located behind lower, center, and upper compartments 108, 110, and 112. Circuit protection system 106 couples a plurality of conductors 506 via first primary connectors 312 within rear compartment 504.

Figure 10:
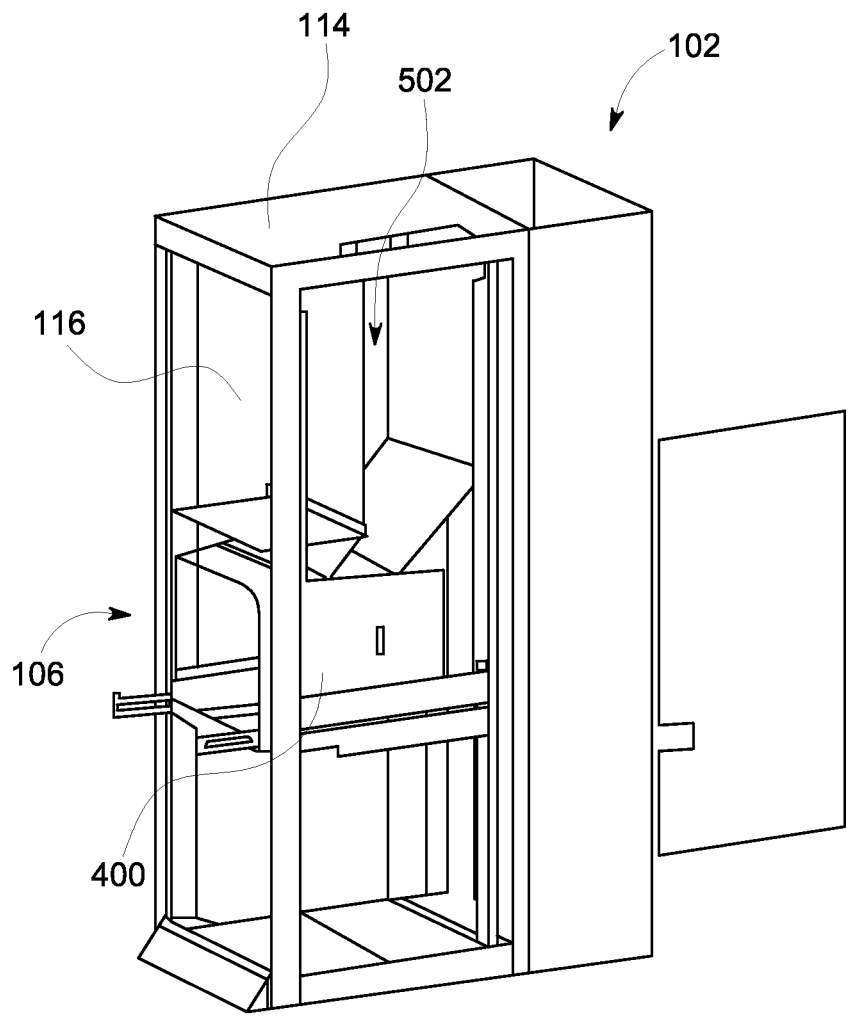
FIG. 10 is a perspective view of the equipment enclosure shown in FIG. 8.
Figure 11:
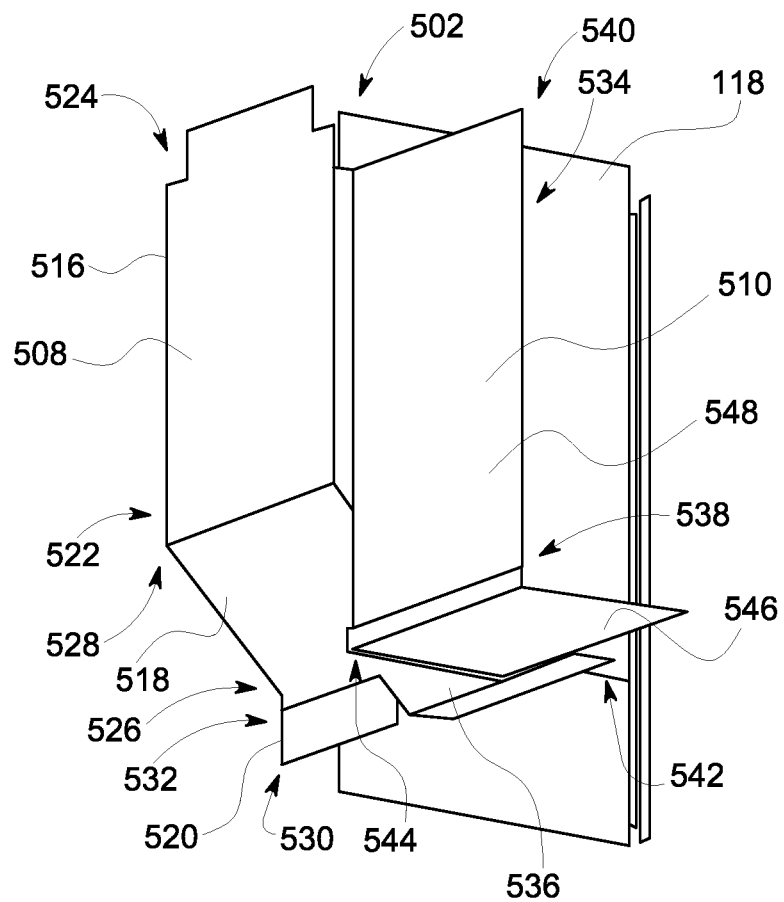
FIG. 11 is a partially exploded view of an exemplary exhaust management portion that may be used with the equipment enclosure shown in FIG. 8.
Figure 12:
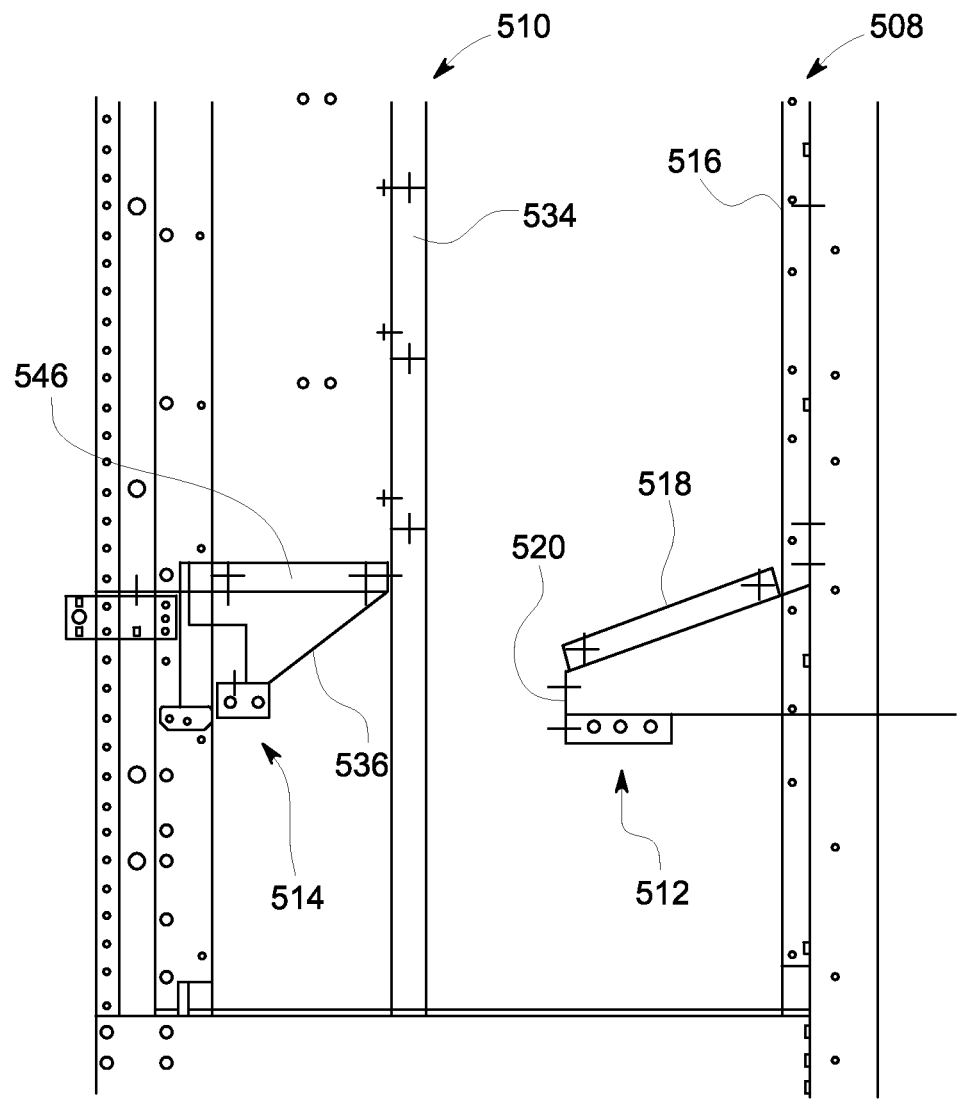
FIG. 12 is a schematic view of the exhaust management portion shown in FIG. 11.

FIG. 10 is a perspective view of equipment enclosure 102; FIG. 11 is a partially exploded view of an exhaust management portion of equipment enclosure 102; and FIG. 12 is a schematic view of the exhaust management portion of equipment enclosure 102. As shown in FIG. 10 a first barrier 508 and a second barrier 510 are each coupled to circuit protection system 106. More specifically, a first crossmember 512 (shown in FIG. 12) is coupled to cassette 400. First barrier 508 is coupled to first crossmember 512 to position exhaust plenum 502 with respect to and/or to couple exhaust plenum 502 in flow communication with circuit protection system 106. First barrier 508 prevents exhaust gases and/or contaminants from bleeding into rear compartment 504, for example. Similarly, a second crossmember 514 (shown in FIG. 12) is coupled to cassette 400. Second barrier 510 is coupled to second crossmember 514 to position exhaust plenum 502 with respect to and/or to couple exhaust plenum 502 in flow communication with circuit protection system 106. Second barrier 510 prevents exhaust gases or other contaminants from contacting controller 300 (shown in FIGS. 5 and 6). In an exemplary embodiment, exhaust plenum 502 is defined between first barrier 508, second barrier 510, first side wall 116, and second side wall 118.

Moreover, first barrier 508 includes a first portion 516, a second portion 518, and a third portion 520. First portion 516 extends substantially vertically from a bottom end 522 to an opposite top end 524 that couples to top wall 114. Second portion 518 includes a bottom end 526 and an opposite top end 528 that couples to bottom end 522 at an angle to facilitate routing the exhaust gases upwards away from circuit protection system 106 through exhaust plenum 502. Third portion 520 also includes a bottom end 530 that couples to first crossmember 512, and an opposite top end 532 that couples to bottom end 526. Similarly, second barrier 510 includes a first portion 534 and a second portion 536. First portion 534 extends substantially vertically from a bottom end 538 to an opposite top end 540 that couples to top wall 114. Second portion 536 includes a bottom end 542 and an opposite top end 544 that couples to bottom end 538 at an angle to facilitate routing the exhaust gases upwards away from circuit protection system 106 through exhaust plenum 502. Moreover, bottom end 542 couples to second crossmember 514. In an exemplary embodiment, a third barrier 546 is coupled to bottom end 542. More specifically, third barrier 546 is coupled to a front surface 548 of second barrier 510 at bottom end 542. Third barrier 546 is oriented substantially perpendicular to first portion 534. Moreover, first portion 534 and third barrier 546 define upper compartment 112. In addition, first portion 534 and third barrier 546 shield electronics modules 104 (shown in FIG. 1) from the exhaust gases.

Figure 13:
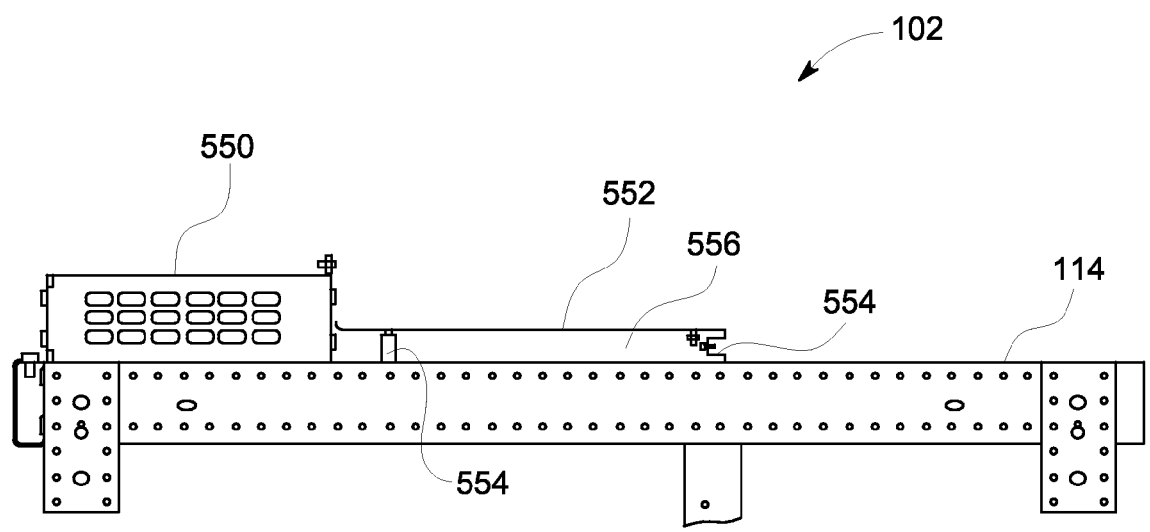
FIG. 13 is a side view of a top wall of the equipment enclosure shown in FIG. 8.

FIG. 13 is a side view of top wall 114 of equipment enclosure 102. A wire channel 550 extends at least partially across top wall 114 between first side wall 116 and second side wall 118 (both shown in FIG. 1). Wire channel 550 enables cabling to be routed into or out of enclosure 102. Moreover, a lid 552 is coupled, such as movably coupled using one or more hinges, to top wall 114. Lid 552 extends at least partially across top wall 114 between first side wall 116 and second side wall 118. Lid 552 is oriented to at least partially cover exhaust plenum 502 (shown in FIGS. 10 and 11). Moreover, a plurality of spacers 554 is coupled to top wall 114. Spacers 554 define a gap 556 between lid 552 and a vent (not shown) at a top end of exhaust plenum 502. Exhaust gases generated by a secondary arc flash within circuit protection system 106 (shown in FIG. 1) are expelled from circuit protection system 106 through exhaust plenum 502 and exit enclosure 102 through a vent (not shown). Some secondary arc flashes generated by circuit protection system 106 may not generate sufficient pressure to expel the exhaust gases through the vent with enough force to cause lid 552 to lift. Accordingly, gap 556 enables the exhaust gases to escape exhaust plenum 502. Moreover, lid 552 prevents contaminants from entering enclosure 102 and/or circuit protection system 106 via exhaust plenum 502.

An exemplary method of assembling electronic equipment stack 100 (shown in FIG. 1) includes coupling first barrier 508 (shown in FIGS. 10-12) to first crossmember 512 (shown in FIG. 12), and coupling second barrier 510 (shown in FIGS. 10-12) to second crossmember 514 (shown in FIG. 12) such that first barrier 508 and second barrier 510 define exhaust plenum 502 (shown in FIGS. 10 and 11). In an exemplary embodiment, exhaust plenum 502 is coupled in flow communication with first and second exhaust ducts 322 and 324 (shown in FIGS. 5 and 6) to route exhaust gases out of enclosure 102 (shown in FIG. 1). Moreover, the method includes coupling first side wall 116 (shown in FIG. 1) to first barrier 508 and second barrier 510, and coupling second side wall 118 (shown in FIG. 1) to first barrier 508 and second barrier 510 such that first barrier 508, second barrier 510, first side wall 116, and second side wall 118 define exhaust plenum 502.

Third barrier 546 (shown in FIGS. 11 and 12) is then coupled to front surface 548 (shown in FIG. 11) of second barrier 510. Third barrier 546 is oriented substantially perpendicularly to second barrier 510 and, more specifically to first portion 534 (shown in FIG. 11) such that second barrier 510 and third barrier 546 define upper compartment 112 (shown in FIG. 1). Moreover, second barrier 510 and third barrier 546 shield upper compartment 112 from the exhaust gases emitted by circuit protection system 106. More specifically, second barrier 510 and third barrier 546 shield electronics modules 104 (shown in FIG. 1) from the exhaust gases.

Furthermore, top wall 114 (shown in FIG. 1) is coupled to first barrier 508 and second barrier 510. A vent (not shown) extends through top wall 114 and is coupled in flow communication with exhaust plenum 502 to enable the exhaust gases to exit enclosure 102. Lid 552 (shown in FIG. 13) is movably coupled to top wall 114. Moreover, lid 552 is oriented to cover at least a portion of the vent.

Exemplary embodiments of apparatus for use in devices for protection of power distribution equipment are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary circuit protection environment, embodiments of the invention are operational with numerous other general purpose or special purpose circuit protection environments or configurations. The circuit protection environment is not intended to suggest any limitation as to the scope of use or functionality of any aspect of the invention. Moreover, the circuit protection environment should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An enclosure for use with a circuit protection system having at least one exhaust duct configured to route exhaust gases out of the circuit protection system, said enclosure comprising:
   a racking cassette configured to support an arc containment device, the racking cassette operative to rack the circuit protection system between at least a first position and a second position;
   a first barrier coupled to the circuit protection system;
   a second barrier coupled to the circuit protection system, said first barrier and said second barrier defining an exhaust plenum coupled in flow communication with the at least one exhaust duct; and
a top wall coupled to said first barrier and said second barrier, a vent extending through said top wall, said vent and is coupled in flow communication with said exhaust plenum to route the exhaust gases out of said enclosure;
wherein when circuit protection system is racked in the first position, the at least one exhaust duct is aligned with the exhaust plenum to facilitate routing exhaust gases generated within arc containment device out of the enclosure.

2. An enclosure in accordance with claim 1, wherein said first barrier comprises:
a first portion extending substantially vertically; and
a second portion coupled to said first portion at an angle to facilitate routing the exhaust gases out of said enclosure through said exhaust plenum.

3. An enclosure in accordance with claim 2, wherein said first barrier further comprises a third portion coupled to said second portion and configured to couple said first barrier to the circuit protection system.

4. An enclosure in accordance with claim 3, wherein said second barrier comprises:
a fourth portion extending substantially vertically; and
a fifth portion coupled to said third portion at an angle, said fifth portion configured to shield the circuit protection system from the exhaust gases.

5. An enclosure in accordance with claim 4, wherein said second barrier further comprises a sixth portion coupled to said fifth portion and configured to couple said second barrier to the circuit protection system.

6. An enclosure in accordance with claim 1, further comprising a third barrier coupled to said second barrier and oriented substantially perpendicularly to said second barrier, wherein said second barrier and said third barrier define a compartment, said second barrier and said third barrier configured to shield said compartment from the exhaust gases.

7. An enclosure in accordance with claim 1, further comprising a lid movably coupled to said top wall and oriented to cover at least a portion of said vent.

8. An enclosure in accordance with claim 1, further comprising an equipment rack, wherein said first barrier and said second barrier are oriented to enable said exhaust plenum to be coupled in flow communication with the circuit protection system when the circuit protection system is positioned in one of a first position and a second position within said equipment rack.

9. A switchgear stack comprising:
a circuit protection system comprising
at least one exhaust duct, said circuit protection system configured to detect a primary arc flash in a circuit and initiate a secondary arc flash in response to the detection of the primary arc flash, said at least one exhaust duct configured to route exhaust gases out of said circuit protection system; and
an enclosure coupled to said circuit protection system, said enclosure comprising:
a racking cassette configured to support an arc containment device, the racking cassette operative to rack the circuit protection system between at least a first position and a second position;
a first barrier coupled to said circuit protection system; and
a second barrier coupled to said circuit protection system, said first barrier and said second barrier defining an internal exhaust plenum coupled in flow communication with said at least one exhaust duct to route the exhaust gases out of said enclosure;
wherein when circuit protection system is racked in the first position, the at least one exhaust duct is aligned with the internal exhaust plenum to facilitate routing exhaust gases generated within arc containment device out of the enclosure.

10. A switchgear stack in accordance with claim 9, wherein said first barrier comprises:
a first portion extending substantially vertically;
second portion coupled to said first portion at an angle to facilitate routing the exhaust gases out of said enclosure through said exhaust plenum; and
a third portion coupled to said second portion and configured to couple said first barrier to said circuit protection system.

11. A switchgear stack in accordance with claim 10, wherein said second barrier comprises:
a fourth portion extending substantially vertically;
a fifth portion coupled to said third portion at an angle, said fifth portion configured to shield said circuit protection system from the exhaust gases; and
a sixth portion coupled to said fifth portion and configured to couple said second barrier to the circuit protection system.

12. A switchgear stack in accordance with claim 9, wherein said enclosure further comprises a third barrier coupled to said second barrier and oriented substantially perpendicularly to said second barrier, wherein said second barrier and said third barrier define a compartment, said second barrier and said third barrier configured to shield said compartment from the exhaust gases.

13. A switchgear stack in accordance with claim 9, wherein said enclosure further comprises a top wall coupled to said first barrier and said second barrier, a vent extends through said top wall and is coupled in flow communication with said exhaust plenum to route the exhaust gases out of said enclosure.

14. A switchgear stack in accordance with claim 13, further comprising a lid movably coupled to said top wall and oriented to cover at least a portion of said vent.

15. A switchgear stack in accordance with claim 9, wherein said circuit protection system comprises a first crossmember and a second crossmember, said first barrier coupled to said first crossmember, said second barrier coupled to said second crossmember.

16. A switchgear stack in accordance with claim 9, further comprising a racking cassette configured to support said circuit protection system in a plurality of positions within said enclosure, wherein said exhaust plenum is coupled in flow communication with said at least one exhaust duct when said circuit protection system is in at least one of the plurality of positions.

17. A method of assembling a switchgear stack including an enclosure and a circuit protection system positioned within the enclosure and having at least one exhaust duct, a first crossmember, and a second crossmember, said method comprising:
coupling a first barrier to the first crossmember, at least a portion of the first barrier extending substantially vertically;
coupling a second barrier to the second crossmember, at least a portion of the second barrier extending substantially vertically such that the first barrier and the second barrier define an exhaust plenum coupled in flow communication with the at least one exhaust duct to route exhaust gases out of the enclosure; and coupling a racking cassette configured to support an arc containment device to the enclosure, the racking cassette operative to rack the circuit protection system between at least a first position and a second position, wherein when circuit protection system is racked in the first position, the at least one exhaust duct is aligned with the internal exhaust plenum.

18. A method in accordance with claim 17, further comprising:
    coupling a first side portion to the first barrier and the second barrier; and
    coupling a second side portion, to the first barrier and the second barrier such that the first barrier, the second barrier, the first side portion, and the second side portion define the exhaust plenum.

19. A method in accordance with claim 17, further comprising coupling a third barrier to the second barrier, the third barrier oriented substantially perpendicularly to the second barrier such that the second barrier and the third barrier define a compartment, the second barrier and the third barrier configured to shield the compartment from the exhaust gases.

20. A method in accordance with claim 17, further comprising:
    coupling a top wall to the first barrier and the second barrier, a vent extending through the top wall, the vent coupled in flow communication with the exhaust plenum; and
    movably coupling a lid to the top wall, wherein the lid is oriented to cover at least a portion of the vent.

* * * * *

UNITED STATES PATENT AND TRADEMARK OFFICE
CERTIFICATE OF CORRECTION

| | | |
|---|---|---|
| PATENT NO. | : 8,598,484 B2 | Page 1 of 1 |
| APPLICATION NO. | : 12/981967 | |
| DATED | : December 3, 2013 | |
| INVENTOR(S) | : Engel et al. | |

It is certified that error appears in the above-identified patent and that said Letters Patent is hereby corrected as shown below:

In the Specification

In Column 4, Lines 44-45, delete "mounting aperture 222" and insert -- mounting aperture 248 --, therefor.

Signed and Sealed this
Eighth Day of April, 2014

Michelle K. Lee
*Deputy Director of the United States Patent and Trademark Office*